July 17, 1951  R. O. BILL  2,560,715
AUTOMOTIVE VEHICLE WITH ELEVATING AND LOWERING BODY
Filed Dec. 6, 1948  3 Sheets-Sheet 1
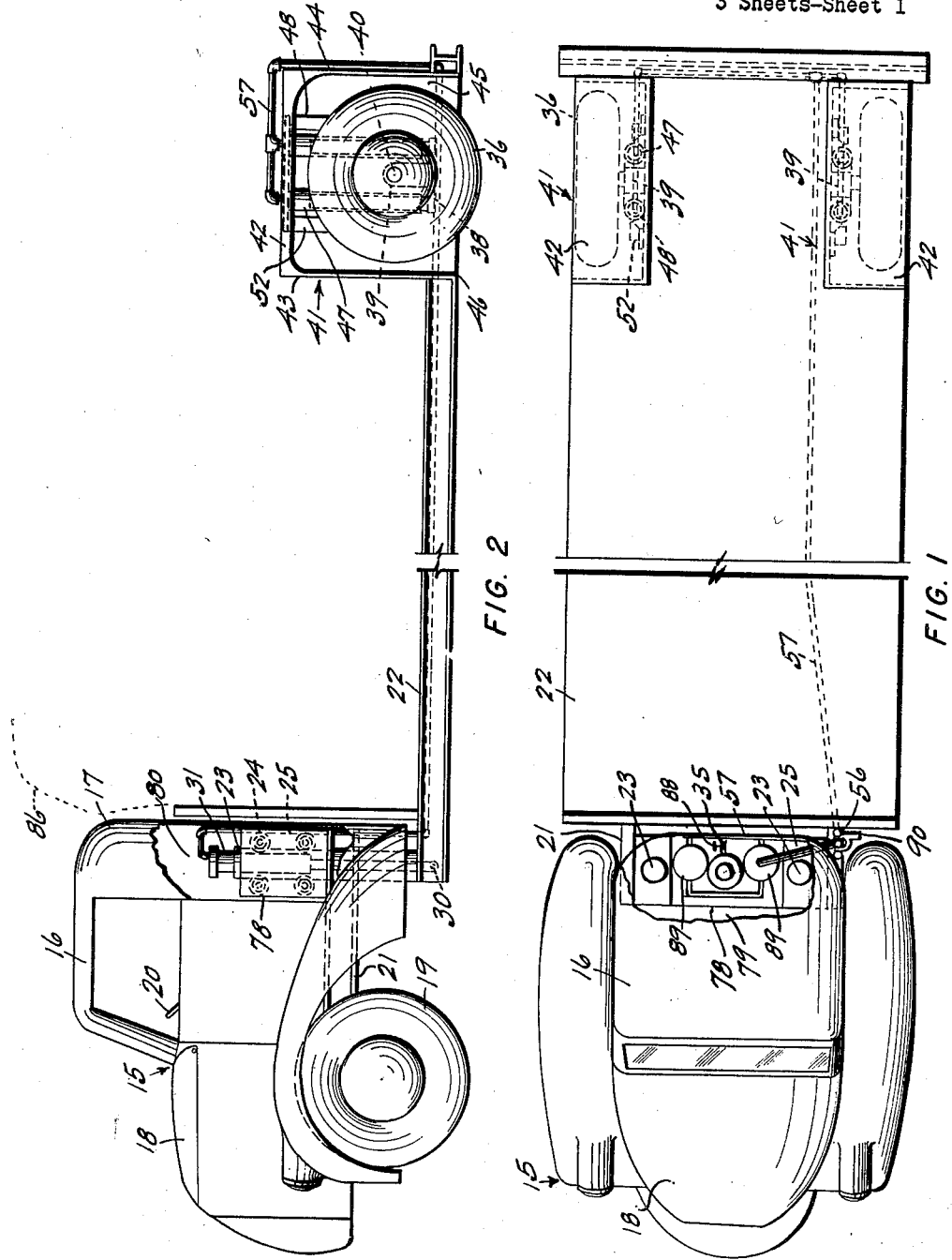
INVENTOR
Robert O. Bill
BY
Philip A. Fredell
Attorney July 17, 1951 R. O. BILL 2,560,715
AUTOMOTIVE VEHICLE WITH ELEVATING AND LOWERING BODY
Filed Dec. 6, 1948 3 Sheets-Sheet 2
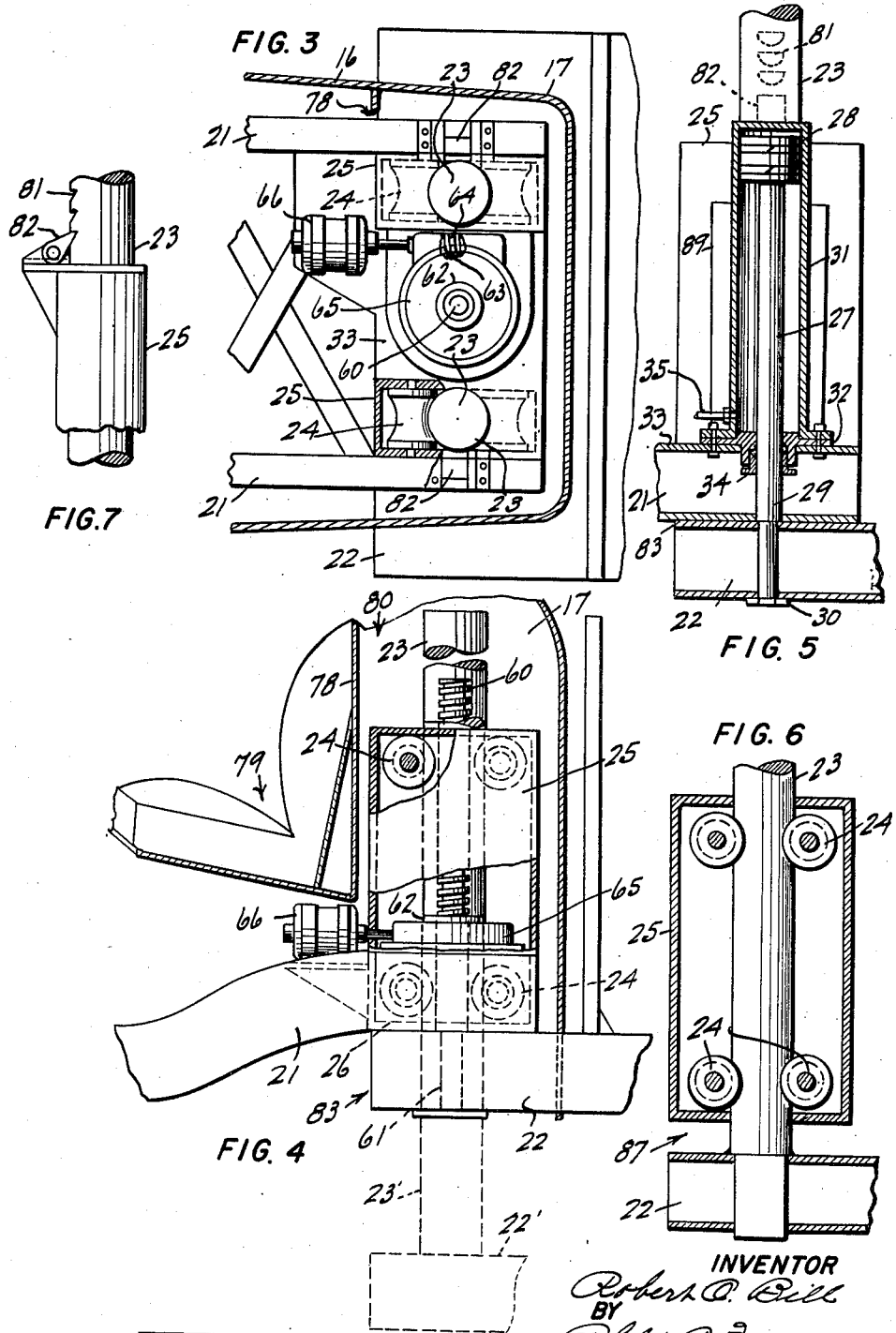
INVENTOR
Robert O. Bill
BY
Philip A. Truesdell
Attorney July 17, 1951 R. O. BILL 2,560,715
AUTOMOTIVE VEHICLE WITH ELEVATING AND LOWERING BODY
Filed Dec. 6, 1948 3 Sheets-Sheet 3
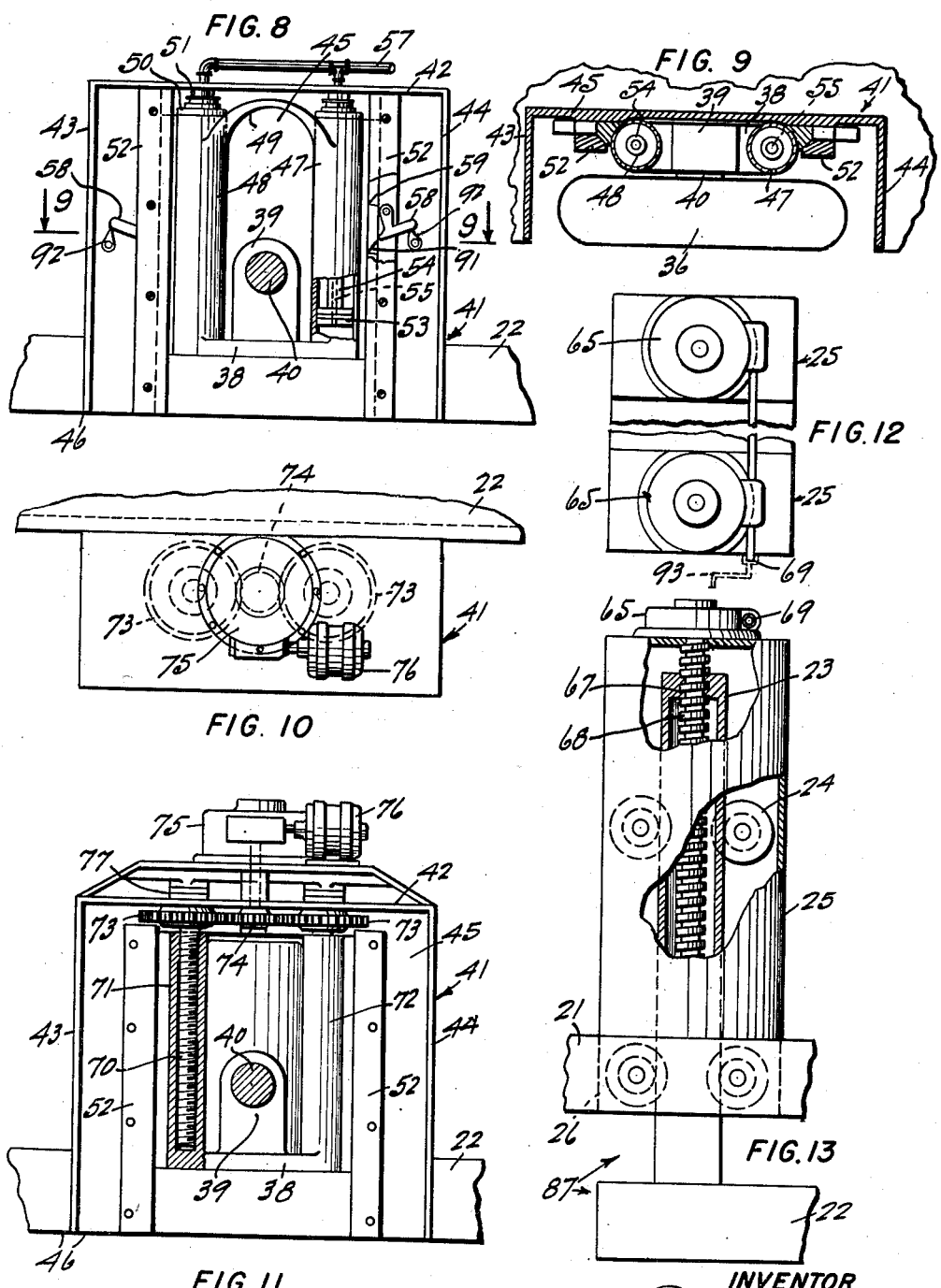

Patented July 17, 1951

2,560,715

UNITED STATES PATENT OFFICE 2,560,715

AUTOMOTIVE VEHICLE WITH ELEVATING AND LOWERING BODY

Robert O. Bill, San Leandro, Calif.

Application December 6, 1948, Serial No. 63,694

9 Claims. (Cl. 280—44)

This invention relates to improvements in automotive vehicles, and particularly to freight trucks, moving vans and the like, and provides a truck wherein the bed or body may be lowered or raised at will for most convenient loading and unloading. With this improved truck it is possible to lower the bed of the truck to rest on the ground or road with the top surface of the bed at curb level, and for traveling to have the bed at a normal road and obstruction clearing level, and locked in that position.

This invention will reduce the time and cost of loading and unloading trucks, reduce the number of employes required for loading and unloading, and make the job easier and more convenient for such help as is required.

With conventional trucks the body or bed is in a fixed position relative to the chassis and road, and at such a height that about the same number of men are required on the truck as are required on the ground, while with this invention only those normally used on the ground are required because they can walk directly on and off the truck, requiring no one on the truck to hand the packages or materials to them. The trucks are therefore loaded and unloaded more rapidly and at less expense.

This invention utilizes the conventional front end or power section but obviously, with a front wheel drive, and this power section may be either the two-wheeled or the multi-wheeled type because a rigid connection is provided between the power or cab section and the platform or body section.

The invention involves elevating means between the cab and the front end of the body or platform, and between the platform and the rear wheel axles, and which elevating means may be either fluid or mechanically actuated and either manually or power operated.

The objects and advantages of the invention are as follows:

First, to provide a truck with elevating and lowering body or bed for convenience in loading and unloading, and to permit passage through underpasses and bridges where the clearance is not quite sufficient to pass the top of the body or the load when at normal level.

Second, to provide a truck as outlined with a front or power end which has a rigid connection to the front end of the body or bed, and in which the rear wheel axles have a rigid connection to the rear end of the body.

Third, to provide a truck as outlined with elevating and lowering means which is capable of lowering the platform to curb level and of elevating the platform to normal road clearance level, at will.

Fourth, to provide a truck as outlined which is relatively simple in construction and arrangement and which is as readily operated on the highway as a conventional truck plus having the advantage of being lowerable to pass through non-clearance underpasses and the like.

In describing the invention reference will be had to the accompanying drawings, in which:

Fig. 1 is a top plan view of the invention with a portion of the top of the cab broken away to show the front end elevating and lowering means.

Fig. 2 is a side elevation of Fig. 1 with a portion of the cab broken away to show the elevating and lowering mechanism for the forward end of the body or platform.

Fig. 3 is a fragmentary enlarged view showing a modification of the elevating and lowering means with power drive.

Fig. 4 is a side elevation of Fig. 3 with portions broken away to show interior constructions.

Fig. 5 is a sectional elevation through one of the hydraulic cylinders and supports.

Fig. 6 is a vertical section through one of the guide housings showing the roller bearings for the guides.

Fig. 7 is a fragmentary view showing the latch means for the guides when hydraulic elevating and lowering means is used.

Fig. 8 is a side elevation of the hydraulic type of elevating and lowering means for the rear end of the body or bed.

Fig. 9 is a section taken on line 9—9 of Fig. 8.

Fig. 10 is a top plan view of mechanically operable elevating and lowering means for the rear end of the body or platform.

Fig. 11 is a side elevation of Fig. 10, shown partly in section.

Fig. 12 is a top plan view of manually operable elevating and lowering means; and Fig. 13 is a side elevation of Fig. 12, showing the elevating and lowering means combined with guiding means through broken away portions of the guide housing.

The invention includes a power driven front unit 15 including a cab 16 the rear end of which is extended as indicated at 17, a hood 18 for the engine for driving the front wheels 19, together with steering mechanism 20 and frame 21 which terminates at the back end of the cab extension 17.

The truck bed 22 has fixedly secured to its forward end a pair of spaced vertical guides such as the heavy bars 23 which may be solid or tubular, and which are each guided by rollers 24 mounted in a housing 25 which is supported by and fixed to the frame 21 of the tractive unit 15 as indicated at 26, with the guides movable in either direction vertically between the rollers, which fit very closely to provide a rigid connection between the tractive unit and the forward end of the body or bed, irrespective of the degree of vertical adjustment.

For hydraulic operation, a piston rod 27 has a piston 28 at its upper end, and has its lower end 29 anchored in the forward end of the platform as indicated at 30, with the piston operating in a cylinder 31 which is anchored through a head 32 to the tractive unit frame cross plate 33 which is supported by the frame 21, suitable packing 34 being provided to prevent leakage, and the cylinder having a fluid connection 35.

The rear wheels 36 are each carried on a stub axle in a manner similar to that disclosed in my copending application, Ser. No. 34,963, filed June 24, 1948, and in which a crossbeam 38 has an upwardly projecting axle bracket 39 in which is fixed a stub axle 40 which carries the wheel 36; a housing 41 having a top wall 42, side walls 43 and 44 and a back wall 45, with the bed base level with the bottoms of the back and side walls as indicated at 46, and which housing replaces the conventional fender and is rigidly constructed to carry the load of that portion of the vehicle.

A pair of pistons or plungers and cylinders cooperate between the respective ends of the cross member and the back wall or top wall of the housing and include both, elevating and lowering, and guiding means, and these cylinders may both be hydraulically actuated, or one may comprise elevating and lowering means combined with guiding means and the other guiding and aligning means only, the two in all cases functioning as an anti-twisting unit to keep the wheel in line.

As illustrated in Figs. 1, 2, 8 and 9 the two cylinders 47 and 48 are formed integral with the cross member and connected together at the top as indicated at 49, and each is provided with a head 50 including suitable packing 51, and these cylinders are suitably guided as by gibs 52 which maintain the wheel unit in perfect alignment.

Each cylinder is provided with a piston 53 connected to a piston rod 54 having an axial bore 55 through which fluid is delivered from the pump 56 through the piping 57.

Latch means 58 rides against the sides 59 of the cylinder guides and engage the tops of the guides when the bed or body is raised to its highest position, so that the bed or body will be locked in raised position and be incapable of lowering while the truck is traveling.

This elevating and lowering means is not limited to fluid operation, but can be carried out by mechanical means well known in the elevating art, but preferably by means of a screw and worm drive, which requires a minimum of power for operation and is self-locking in any adjusted position.

As illustrated in Figs. 3 and 4, a screw 60 has its lower end 61 anchored in the frame 22, and with the screw threadedly operating through the hub 62 of a worm gear 63 which is driven by a worm 64 within the housing 65 which is mounted on top of the cross member 33, the worm being either manually operable or operable by means of a power unit such as the motor 66.

Figs. 12 and 13 illustrate another method of mechanical operation in which the guide posts 23 are tubular and each of which has a head 67 which is axially threaded for the screw 68 and which screw is anchored in the worm gear housing and driven by the worm gear and worm through a shaft 69 to which a crank may be applied for manual turning of the worm, thus eliminating the central screw and combining the guiding and elevating means in the same units.

The same applies to the rear wheel mountings in which the screws 70 operate in the vertical columns 71 and 72 and each of which screws are fixed in a gear 73 driven simultaneously by an intervening pinion 74 which in turn is driven by the worm gear reduction unit 75 and which in turn is driven either manually or by power means such as the motor 76, the loads being taken by the thrust bearings 77.

The cab is extended rearwardly preferably to cover the forward elevating mechanism, the normal rear wall of the cab being located at about 78 which backs the driver's seat 79, and the extension covering the entire elevating unit as indicated at 80.

With the hydraulic system, ratchet teeth 81 may be cut in the side of each guide which does not cooperate with the rollers, and with a pawl 82 mounted on the top of the guide housing to engage the teeth as the body is elevated, the pawls being readily manually releasable for lowering by initially slightly raising the body.

While traveling the bed is raised to its highest position as indicated at 83 in Figs. 4 and 5, to provide ample road clearance. When approaching an underpass or a bridge which does not provide sufficient clearance for the body or load 86, the body can be lowered to any necessary extent intermediate the highest and lowest positions as indicated at 87 in Figs. 6 and 13, being elevated to highest position as soon as the truck has cleared the overhead obstruction.

When the destination is reached, the bed may be left in its highest position if the truck is to be unloaded onto an elevated platform, or lowered to suit, and if to be unloaded to street or ground level the body can be lowered to its lowermost position as indicated in Fig. 2 in which case the bed will rest on the street or ground and the top of the bed will be at about curb level, under which conditions no one is required on the truck to hand the merchandise to others handling on the ground because the same workers can walk directly onto the bed, and carry on the unloading alone. This is of special advantage when loading or unloading heavy articles such as barrels of merchandise, pianos, large heavy shipping cases and the like.

When the bed or body is to be lowered the valve 88 is opened to allow the fluid in the cylinders 31, 47 and 48 to flow back to the supply tanks 89, the valve being closed when the bed reaches the level desired.

To elevate the bed, the valve 88 is closed and the pumps 56 are operated as by a section of pipe being placed over the handle 90 on the pump and manually operating the pump to deliver fluid from the tanks 89 to the cylinders to elevate the bed to the desired height. The pawl 82 engages in the teeth 81 on the posts 23 so that the bed will maintain any desired elevation. Similar teeth 91 can be formed in the guide members on the rear wheel elevating cylinders to cause the pawls 58 to latch at various heights, and if the bed is raised to its limit, the pawls will engage the top of the slide and thus lock the bed against accidental lowering. Cam members 92 are provided to keep the pawls from engaging in the teeth 91 when the bed is being lowered, and it is only necessary to drop the pawls 82 back and turn the cams 92 following a slight raising of the bed to permit the bed to lower to any desired level, and if that level is to be maintained, the pawls can be placed in operation to latch the bed in the adjusted position.

With mechanical means, either prime movers such as the motors 76, or manual operation may be resorted to. Obviously racks and pinions and similar arrangements would prove undesirable for several reasons, requiring latching devices and being more difficult to control and operate, while a combination of screw and worm drive is easily operated, requires relatively little power, and functions as its own locking means, and therefore is the most dependable and desirable of all types of mechanical arrangements. With the screw and worm gear drive the bed can be elevated or lowered at will such as by the shaft 69 to which a crank 93 can be attached, or the three motors 66 and 76 can be connected in parallel for simultaneous operation of all of the screws.

I claim:

1. A highway truck comprising a tractive front section including a cab having a driver's seat, and manually operable steering means in said cab; a frame having a rearward extension beyond said driver's seat, and tractive wheels; a bed having rear wheels and a front end and a rear end, and having a rigid vertically sliding connection to said frame behind said driver's seat, and elevating and lowering means for said bed and cooperating between said front end of said bed and said rearward extension, and second elevating and lowering means cooperating between the rear end of said bed and said rear wheels, and operating means for said elevating and lowering means for lowering the bed at will to clear overhead highway obstructions and for convenience in loading and unloading the truck; a fender for each rear wheel and fixed to said bed, said rear wheels including individual mounting means including a vertically slidable crosshead having a hub having a stub axle fixed therein and projecting outwardly therefrom for each wheel to permit lowering of the bed to the support surface for the wheels, and a slide way fixed on each fender for said slidable crossheads, and with said elevating and lowering means cooperating between said slidable crossheads and said fenders.

2. A highway truck comprising a tractive front section including a cab having a driver's seat, and manually operable steering means in said cab; a frame having a rearward extension beyond said driver's seat, and tractive wheels; a bed having rear wheels and a front end and a rear end, and having a rigid vertically sliding connection to said frame behind said driver's seat, and elevating and lowering means for said bed and cooperating between said front end of said bed and said rearward extension, and second elevating and lowering means cooperating between the rear end of said bed and said rear wheels, and operating means for said elevating and lowering means for lowering the bed at will to clear overhead highway obstruction and for convenience in loading and unloading the truck; said rigid connection comprising spaced vertical members rigidly fixed on said front of said bed, and guiding means therefor rigidly mounted on said rearward extension to provide said rigid connection between the bed and the front section to form a complete rigid highway truck assembly irrespective of the elevating or lowering adjustment of the bed within its limits of adjustments; a fender for each rear wheel and fixed on said bed; said rear wheels including individual mounting means including a vertically slidable crosshead having a hub having a stub axle fixed therein and projecting outwardly therefrom for each wheel to provide clearance between the crossheads, axles and wheels on the respective sides of the bed to permit lowering the bed to the support surface for the wheels, and a slide way on each side and fixed on each fender for said slidable crossheads, and with said elevating and lowering means cooperating between said slidable crossheads and said fenders.

3. A highway truck comprising; a front tractive section including front wheels and a cab having a driver's seat, and steering means in said cab and a frame having a portion projecting rearwardly of said cab; a bed having rear wheels and a fender for each rear wheel, rear wheel mounting means comprising a stub axle for each wheel and a crosshead in which the inner end of the axle is fixed, and means for maintaining tracking alignment of said wheels in the path of travel, and first elevating means for each side of said bed and cooperating between the crosshead and the fender for elevating and lowering the rearward end of said bed at will, vertically slidable connecting means forming a rigid connection between said portion projecting rearwardly and the forward end of said bed, and second elevating means cooperating between said forward end of said bed and said portion projecting rearwardly for elevating and lowering said forward end at will, and power means for operating said elevating and lowering means, whereby said bed may be lowered at will to clear overhead obstructions and for loading and unloading the truck, and elevated for normal road clearance for highway transport.

4. An automotive vehicle comprising; a front tractive section including front wheels and a cab and steering means and a frame; a bed having rear wheels and a housing for each rear wheel, rear wheel mounting means comprising a stub axle for each wheel and a support therefor, means for maintaining tracking alignment of said wheels in the path of travel, and first elevating means cooperating between said support and the rear portion of said bed for elevating and lowering the rearward end of said bed at will, vertically slidable connecting means forming a rigid connection between said frame and the forward end of said bed, and second elevating means cooperating between said forward end of said bed and said frame for elevating and lowering said forward end at will; said bed having a housing on each side adjacent the rearward end and each functioning as a fender for the wheel; said means for maintaining tracking alignment of said wheels each comprising guide means integral with said support and means for slidably securing said guide means to said housing and including releasable securing means for securing said guide means against sliding movement with predetermined degrees of adjustment.

5. An automotive vehicle comprising; a front tractive section including front wheels and a cab and steering means and a frame; a bed having rear wheels and a housing for each rear wheel, rear wheel mounting means comprising a stub axle for each wheel and a support therefor, means for maintaining tracking alignment of said wheels in the path of travel, and first elevating means cooperating between said support and the rear portion of said bed for elevating and lowering the rearward end of said bed at will, vertically slidable connecting means forming a rigid connection between said frame and the forward end of said bed, and second elevating means cooperating between said forward end of said bed and said frame for elevating and lowering said forward end at will; said bed having a housing on each side adjacent the rearward end and each functioning as a fender for the wheel; said means for maintaining tracking alignment of said wheels each comprising guide means integral with said support and means for slidably securing said guide means to said housing and including releasable securing means for securing said guide means against sliding movement with predetermined degrees of adjustment; said vertically slidable connecting means comprising two vertical members attached at their lower ends to the forward end of said bed in spaced relation, and guiding means mounted on said frame for rigidly slidably guiding said vertical members.

6. A highway transportation truck comprising a tractive front end including a frame, front tractive wheels, an engine hood, a cab, a driver's seat and steering means in said cab; a bed having rear wheels and axles and supports therefor; a fender for each rear wheel, a rigid sliding connection between said frame behind said seat, and the front end of said bed, and sliding connections between said supports and the fenders; and means cooperating between the front end of said bed and said frame, and between the rear end of said fenders and said supports and operable for elevating and lowering said bed at will relative to said axles and said frame to permit lowering of the bed at will to clear overhead obstructions along a highway, and for convenience in loading and unloading said truck.

7. A highway truck comprising; a power driven front unit including front drive wheels, a cab having a driver's seat and steering means therein; a frame supported by said drive wheels and having said cab mounted thereon and having a support portion extending rearwardly of said driver's seat, a bed having a forward end and a rear end; rear wheels for the rear end of said bed, and axles for said rear wheels; longitudinally spaced vertical guide means, and elevating and lowering means cooperating between said bed and each axle; transversely spaced guiding means and elevating and lowering means cooperating between said support portion and said forward end, and operating means for all of said elevating and lowering means; whereby said bed may be lowered to clear overhead highway obstructions and for convenience in loading and unloading, and may be elevated to provide normal road clearance for travel along a highway; said cab extending rearwardly to the terminal end of said support portion; said transversely spaced guiding means comprising spaced vertical bearings fixedly mounted on said support portion within the rearward portion of said cab, and spaced standards having their lower ends fixed to the forward end of said bed and slidably operating in said vertical bearings.

8. A highway truck comprising; a power driven front unit including front drive wheels, a cab having a driver's seat and steering means therein; a frame supported by said drive wheels and having said cab mounted thereon and having a support portion extending rearwardly of said driver's seat, a bed having a forward end and a rear end; rear wheels for the rear end of said bed, and axles for said rear wheels; longitudinally spaced vertical guide means, and elevating and lowering means cooperating between said bed and each axle; transversely spaced guiding means and elevating and lowering means cooperating between said support portion and said forward end, and operating means for all of said elevating and lowering means; whereby said bed may be lowered to clear overhead highway obstructions and for convenience in loading and unloading, and may be elevated to provide normal road clearance for travel along a highway; a crosshead for each axle with the axle having its inner end fixed therein with the other end projecting outwardly with the bed clearing the crossheads, wheels and axles to permit lowering the bed to rest on the supporting surface for the wheels, and with said longitudinally spaced vertical guiding means and elevating and lowering means cooperating through the respective ends of the crosshead and thus forming means for maintaining tracking alignment of the wheels in the path of travel of the truck; said cab extending rearwardly to the terminal end of said support portion; said transversely spaced guiding means comprising spaced vertical bearings fixedly mounted on said support portion within the rearward portion of said cab, and spaced standards having their lower ends fixed to the forward end of said bed and slidably operating in said vertical bearings.

9. A highway truck comprising; a power driven front unit including front drive wheels, a cab having a driver's seat and steering means therein; a frame supported by said drive wheels and having said cab mounted thereon and having a support portion extending rearwardly of said driver's seat, a bed having a forward end and a rear end; rear wheels for the rear end of said bed, and axles for said rear wheels; longitudinally spaced vertical guide means, and elevating and lowering means cooperating between said bed and each axle; transversely spaced guiding means and elevating and lowering means cooperating between said support portion and said forward end, and operating means for all of said elevating and lowering means; whereby said bed may be lowered to clear overhead highway obstructions and for convenience in loading and unloading, and may be elevated to provide normal road clearance for travel along a highway; and releasable securing means for securing said guiding means against sliding movement with predetermined degrees of adjustment.

ROBERT O. BILL.

REFERENCES CITED

The following references are of record in the file of this patent:

UNITED STATES PATENTS

| Number | Name | Date |
|---|---|---|
| 2,002,605 | Kincaid, Jr. | May 28, 1935 |
| 2,059,205 | Buffington | Nov. 3, 1936 |
| 2,372,585 | Klumb et al. | Mar. 27, 1945 |